United States Patent [19]

Cockbain et al.

[11] 4,055,451
[45] Oct. 25, 1977

[54] COMPOSITE MATERIALS

[76] Inventors: Alan Gray Cockbain, Inglewood Church Road, Evenley, near Brackley, Northamptonshire, England; Michael John Latimer, 355, Birchfield Road East, Northampton, Northamptonshire, England; Norman Lawrence Parr, 2, Surbiton Court, St. Andrews Square, Surbiton, Surrey, England

[21] Appl. No.: 688,556

[22] Filed: May 21, 1976

Related U.S. Application Data

[62] Division of Ser. No. 501,439, Aug. 28, 1974, abandoned.

[30] Foreign Application Priority Data

Aug. 31, 1973 United Kingdom .............. 41189/73

[51] Int. Cl.² .................. C04B 35/64; C04B 37/02
[52] U.S. Cl. .................................. 156/89; 29/469.5; 156/322; 228/195; 228/228; 228/234; 264/60; 428/325; 428/472; 428/539
[58] Field of Search ............ 156/89, 322; 428/472, 428/539, 323, 325; 228/195, 228, 234; 65/59 R; 29/469.5, 195, 182.5; 264/56-58, 60

[56] References Cited

U.S. PATENT DOCUMENTS

| | | | |
|---|---|---|---|
| 3,132,044 | 5/1964 | Pearson | 428/472 |
| 3,189,477 | 6/1965 | Shaffer | 428/472 |
| 3,340,026 | 9/1967 | Kiwak | 428/472 |
| 3,438,118 | 4/1969 | Milch et al. | 156/89 |
| 3,565,684 | 2/1971 | Buck | 428/539 |
| 3,676,292 | 7/1972 | Prylor et al. | 428/539 |
| 3,825,468 | 7/1974 | Wojcik et al. | 428/322 |

FOREIGN PATENT DOCUMENTS 887,942  1/1962  United Kingdom

*Primary Examiner*—Edward G. Whitby
*Attorney, Agent, or Firm*—Cushman, Darby & Cushman

[57] ABSTRACT

The invention concerns a method of fabricating ceramic/metal or ceramic/ceramic composites. A porous surface region is produced on a ceramic material by sintering a granular substance onto the latter. Metal infiltrated into the porous region is then firmly mechanically bonded to the ceramic. Alternatively, the porous region provides a surface of large effective area to which another ceramic may be bonded chemically and mechanically.

5 Claims, 4 Drawing Figures

COMPOSITE MATERIALS

This is a division of application Ser. No. 501,439 filed Aug. 28, 1974 now abandoned.

This invention relates to composite, layered or sandwich materials and to methods of fabricating them.

Conventional techniques for bonding for example, a ceramic material to a metal or another ceramic rely on wetting the ceramic surface by the use of a glaze or fluxing agent. The wetting may be carried out using a metal oxide for example, and the two materials are then bonded together chemically. The formation of such combinations is therefore dependent on achieving a suitably strong chemical bond, and many ceramic/metal or ceramic/ceramic composites are difficult if not impossible to fabricate to an acceptable degree of strength because of this requirement. The present invention provides a method of attaching ceramics to metals which does not rely solely on chemical bonding and an alternative method of forming ceramic/ceramic bonds and obtaining a material thereby having a range of physical properties.

According to the present invention, a composite material comprises a first principal member of ceramic material having a porous surface region formed by the sintering thereon of vitreous or ceramic granules and a second principal member bonded to the first principal member by the pervasion of the pores of the porous region of the first principal member by the material of the second principal member.

The material of the second principal member is advantageously either metallic or ceramic, the metallic material being selected from aluminium, copper, iron, lead, gold, platinum, tin, nickel, steel, stainless steel, bronze, brass and nichrome, and the ceramic material from silicon nitride, aluminium oxide, boron carbide and tungsten carbide.

The granular material is preferably ceramic or vitreous, the ceramic material being selected from silicon nitride, silicon carbide, aluminium oxide, boron carbide, tungsten carbide and a metal silicate or aluminate.

Conveniently, the granular material and the material of the first principal member are the same.

The invention in another aspect thereof provides a method of manufacturing a composite material including forming a porous surface region on a first principal member of ceramic meterial by sintering thereon a granular substance and pervading the said porous surface region with a second principal member, thereby bonding together the first and second principal members.

In order that the invention may be more fully understood, embodiments thereof will now be described, by way of example only, with reference to the accompanying drawings, in which.

Figure 1:
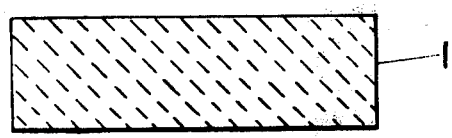
FIG. 1 is a vertical cross-section of the first principal member of a hot-pressed silicon nitride of theoretical density.

Referring to the drawings, in which like reference numerals are used for like parts, FIG. 1 is a vertical cross-section of a first principal member 1 of hot-pressed silicon nitride powder.

Figure 2:
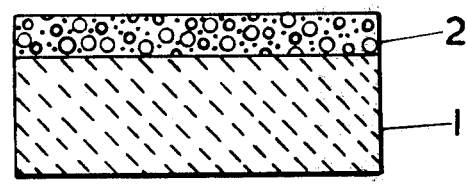
FIG. 2 is a vertical cross-section of the first principal member shown in FIG. 1 with an adherent, porous region of silicon nitride granules firmly attached thereto by hot-pressing.
Figure 3:
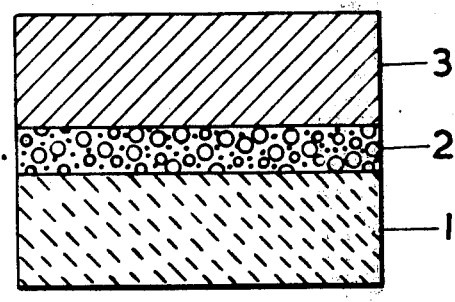
FIG. 3 is a vertical cross-section of the combination shown in FIG. 2 with a second principal member of metal penetrating into the pore cavities of the porous region.

The silicon nitride can be formed by any one of a number of known methods of preparation, including the nitriding of silicon metal powder as described for example in Specification No. 887942. The silicon nitride is then crushed, milled in a steel ball mill, washed with dilute hydrochloric acid and with water, and then finally dried to a powder. The powdered silicon nitride is then mixed with a fluxing agent in powdered form such as magnesium oxide, lithium carbonate, magnesium nitride, calcium oxide, aluminium oxide, ferric oxide, calcium nitride, beryllium oxide or beryllium nitride. The mixture is then placed in a graphite die and pressed in the die at pressures in the region of 3,000 lbs per square inch at temperatures in the range of 1500°–1900° C and the die is then cooled. A second deeply porous layer 2 of silicon nitride granules is then produced, as shown in FIG. 2, by loosely packing a layer of crushed, hot-pressed silicon nitride granules on top of the layer 1 and hot-pressing the assembly for an hour in graphite dies at a temperature of 1700° C to bond the granules to layer 1 without eliminating interconnecting porosity. The size of the granules used is graded according to the required physical properties of the composite material. A third operation is now carried out, whose effect is illustrated in FIG. 3, a metal is heated to a temperature just below its melting point and spread over the exposed surface of the granular layer 2 under light pressure within the graphite dies so that the metal is able to diffuse into the pore spaces of the granular layer to provide a tough metallic facing material 3 which is firmly bonded to the granular layer, which, in turn, is firmly bonded to the first layer of hot-pressed silicon nitride powder. A modification of the method is to incorporate a wetting agent such as titanium hydride within the assembly before forming the third metallic layer.

Modifications to the process can be chosen to give selected thickness of facing material and degree of granulation within the intermediate layer. The resulting product has wide potential in engineering systems, where hard wear resisting or outlining faces require to be attached to metallic supporting structures.

A second example of the invention, not illustrated, is the production of aluminium/alumina composites. A layer of 10 to 20 mesh recrystallised alumina is hot-pressed onto a piece of dense alumina ceramic at 1600° C and 3000 lbs per square inch for 1 hour. Subsequently, a layer of aluminium is hot-pressed onto the resulting porous faced ceramic at 600° C and 3000 lbs per square inch for 1 hour.

Figure 4:
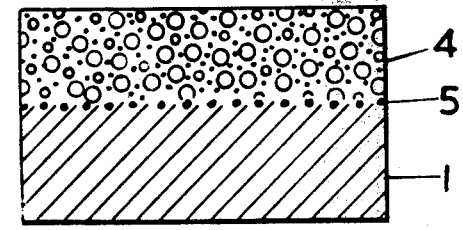
FIG. 4 is a vertical cross-section of a modified sandwich in which one ceramic body is attached to another by means of a porous region of hot-pressed granules.

A further example of the invention is the production of silicon nitride grit faced tiles, similary fabricated; 10 to 20 mesh silicon nitride containing 5% Mg O is hot-pressed to a dense mass then crushed to particles which are subsequently hot-pressed onto a tile of dense, hot-pressed silicon nitride at 1700° C and 3000 lbs per square inch for 1 hour. The porous faces of these tiles may then be pervaded or infiltrated by hot-pressing thereon aluminium at 600° C and 3000 lbs per square inch for one hour. In a similar fashion, one ceramic body may be attached to another by incorporating an intermediate layer of pressure sintered granules between the mating surfaces during the hot-pressing operation. A typical example of this shown in FIG. 4 is the attachment of a layer of hot-pressed silicon nitride 1 to a layer of reaction-bonded silicon nitride 4 by employing an interface of silicon carbide granules 5, to provide a strong chemical and mechanical bond. The layer of bonding granules may be used separately or in the presence of a catalyst such as finely divided silicon nitride powder, or such powder containing 5% magnesia.

With regard to the strength of a ceramic/metal composite, this is dependent partly on the degree of interlock of the metal and the porous layer, and partly on the tensile strengths of the metal and the ceramic. In the case where the strengths are the same, the maximum attainable strength will be half that of either constituent since the cross-sectional area of each component in the intiltrated region will ideally also be half. To maximise the strength of composites of materials having differing tensile strengths, the cross-sectional areas of the two materials at the interface should be in the inverse ratio of their tensile strengths. Similar considerations apply to the formation of a chemical bond between two ceramic materials.

The invention provides a method of mechanically bonding two materials and therefore makes possible the production of a large range of ceramic/metal composites hitherto impossible because of chemical incompatability.

The invention may be considered in one aspect as a method for producing a porous, high surface area region on the surface of a ceramic material onto which region a metallic material may be pressed such that the metal is extruded into the pores of the porous region, thereby interlocking the metallic and ceramic materials. Alternatively, the porous region provides a high surface area region well suited to chemical and mechanical bonding to another ceramic. The criteria for the invention to be exercised effectively are that the granular material, which may be vitreous or ceramic, is chosen to be capable of sintering to the ceramic first principal member, and either the metallic material is capable of being extruded into the porous region or the ceramic second principal member is capable of combining chemically with the porous region. It will be clear to workers in the ceramic and metallurgical arts that these requirements are not strict, and embrace a large group of materials. Accordingly, it is not intended to limit the scope of the invention to the examples hereinbefore described. Suitable ceramic materials include, for example, silicon nitride, tungsten carbide, boron carbide, silicon carbide, aluminium oxide and magnesium oxide, whereas appropriate granular material include ceramic and vitreous materials, particular ceramics being, for example, silicon nitride, silicon carbide, aluminium oxide, boron carbide, tungsten carbide and metal silicates or aluminates. Among the suitable metallic materials are aluminium, copper, iron, lead, gold, platinum, tin, nickel, steel, stainless steel, bronze, brass and nichrome.

What we claim is:

1. A method of making a ceramic/metal composite, the method of comprising the steps of:
   1. Sintering ceramic granules onto at least a part of the surface of a ceramic body to form a porous layer thereon.
   2. Heating a metallic member to a temperature just below its melting point, and
   3. Hot-pressing the said metallic member onto the said porous layer until the said metallic member is at least partially infiltrated into, and is interlocked with, the pores of the said porous layer.

2. A method according to claim 1 wherein the ceramic granules are composed of material selected from the group consisting of silicon nitride, boron carbide, tungsten carbide, silicon carbide aluminum oxide, a metal silicate or a metal aluminate.

3. A method according to claim 2 wherein the metallic member is selected from the group consisting of aluminum, copper, iron, lead, gold, platinum, tin, nickel, steel, stainless steel, bronze, brass and nichrome.

4. A method according to claim 1 wherein the metallic member is selected from the group consisting of aluminum, copper, iron, lead, gold, platinum, tin, nickel, steel, stainless steel, bronze, brass and nichrome.

5. A method of making a ceramic/metal composite, said method including the successive steps of:
   1. sintering ceramic granules onto at least a part of the surface of a ceramic body to form a porous layer thereon,
      said ceramic granules composed of silicon nitride, boron carbide, tungsten carbide, silicon carbide, aluminum oxide, a metal silicate or a metal aluminate;
   2. heating a metallic member to a temperature just below its melting point,
      said metal being aluminum, copper, iron, lead, gold, platinum, tin, nickel, steel, stainless steel, bronze, brass or nichrome; and thereafter
   3. hot pressing the metallic member onto the porous layer until the metallic member is at least partially infiltrated into, and is interlocked with, the pores of the porous layer forming a mechanical bond to the ceramic.

* * * * *